(12) United States Patent
Endo et al.

(10) Patent No.: US 11,960,121 B2
(45) Date of Patent: Apr. 16, 2024

(54) OPTICAL CONNECTION STRUCTURE

(71) Applicant: NIPPON TELEGRAPH AND TELEPHONE CORPORATION, Tokyo (JP)

(72) Inventors: Jun Endo, Tokyo (JP); Kota Shikama, Tokyo (JP); Atsushi Aratake, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 448 days.

(21) Appl. No.: 17/293,705

(22) PCT Filed: Nov. 28, 2019

(86) PCT No.: PCT/JP2019/046616
§ 371 (c)(1),
(2) Date: May 13, 2021

(87) PCT Pub. No.: WO2020/121832
PCT Pub. Date: Jun. 18, 2020

(65) Prior Publication Data
US 2021/0405297 A1  Dec. 30, 2021

(30) Foreign Application Priority Data
Dec. 12, 2018 (JP) ................. 2018-232165

(51) Int. Cl.
*G02B 6/30* (2006.01)
(52) U.S. Cl.
CPC .................... *G02B 6/30* (2013.01)

(58) Field of Classification Search
None
See application file for complete search history.

(56) References Cited

U.S. PATENT DOCUMENTS

| 9,482,818 | B2* | 11/2016 | Kachru ............... G02B 6/32 |
| 10,809,468 | B2 | 10/2020 | Houbertz et al. | |
| 2005/0152643 | A1* | 7/2005 | Blauvelt ............ G02B 6/4206 |
| | | | | 385/31 |
| 2006/0239612 | A1* | 10/2006 | De Dobbelaere ....... G02B 6/42 |
| | | | | 385/37 |
| 2007/0201797 | A1* | 8/2007 | Grzybowski ....... G02B 6/4226 |
| | | | | 385/52 |

(Continued)

FOREIGN PATENT DOCUMENTS

| JP | 2018533033 A | 11/2018 |
| WO | 2018083191 A1 | 5/2018 |

OTHER PUBLICATIONS

Xiaojie, Yin, "Design and Simulation Analysis of Spot-Size Converter in Silicon-On-Insulator," Conference on Lasers and Electro-Optics/Pacific Rim, Aug. 31-Sep. 3, 2009, 2 pages.

*Primary Examiner* — Jerry Rahll
(74) *Attorney, Agent, or Firm* — Slater Matsil, LLP

(57) ABSTRACT

An embodiment optical body is provided in a propagation path of light between a Si waveguide and an optical fiber. The optical body changes a course of some of radiation mode light, which is emitted from the Si waveguide and propagates in a direction away from an optical axis thereof, to obtain waveguide mode light passing through itself. Thus, the amount of waveguide mode light incident on the optical fiber increases, and the coupling efficiency between the Si waveguide and the optical fiber is improved.

20 Claims, 16 Drawing Sheets

(56) References Cited

U.S. PATENT DOCUMENTS

| | | | |
|---|---|---|---|
| 2014/0185983 A1* | 7/2014 | Sandhu | G02B 6/4225 |
| | | | 29/25.35 |
| 2016/0246004 A1* | 8/2016 | Kachru | G02B 6/4214 |
| 2019/0258175 A1 | 8/2019 | Dietrich et al. | |
| 2022/0057578 A1* | 2/2022 | Endo | G02B 6/26 |
| 2022/0057580 A1* | 2/2022 | Endo | G02B 6/30 |

* cited by examiner

OPTICAL CONNECTION STRUCTURE

This patent application is a national phase filing under section 371 of PCT/JP2019/046616, filed Nov. 28, 2019, which claims the priority of Japanese patent application no. 2018-232165, filed Dec. 12, 2018, each of which is incorporated herein by reference in its entirety.

TECHNICAL FIELD

The present invention relates to an optical connection structure that provides connection between optical waveguides having different mode fields.

BACKGROUND

In recent years, a technique called "silicon photonics" has been attracting attention as a technique for collectively integrating optical electronic devices on a silicon substrate. In silicon photonics, a waveguide (hereinafter, also referred to as a Si waveguide) includes a core formed of silicon (Si) and a clad formed of quartz ($SiO_2$). In order to transmit guided light of the Si waveguide with high coupling efficiency via an optical fiber, an optical connection structure that matches a mode field of the Si waveguide and a mode field of the optical fiber is required.

FIG. 11 illustrates a conventional optical connection structure that couples optical waveguides having different mode fields. This example has a tapered structure in which a cross-sectional area of a core of a Si waveguide 1 monotonically reduces in a propagation direction of light (see, for example, NPL 1), and the Si waveguide 1 and an optical fiber 2 are bonded by a resin adhesive material 3. In this example, the resin adhesive material 3 functions as an optical connection structure. Hereinafter, the resin adhesive material 3 is referred to as a conventional optical connection structure 100'.

Also, in FIG. 11, the z axis indicates the propagation direction of light (direction along an optical axis), the y axis indicates a vertical direction, and the x axis indicates a horizontal direction. Further, the Si waveguide 1 is configured of a core (Si waveguide core) 1-1 and a clad (Si waveguide clad) 1-2, and the optical fiber 2 is configured of a core (fiber core) 2-1 and a clad (fiber clad) 2-2. In the Si waveguide 1, the Si waveguide core 1-1 has a tapered structure in which a cross-sectional area thereof monotonically reduces in the propagation direction of light. In addition, an optical axis of the Si waveguide 1 and an optical axis of the optical fiber 2 are adjusted in position to coincide with each other.

CITATION LIST

Non Patent Literature

[NPL 1] Yin Xiaojie, "Design and Simulation Analysis of Spot-Size Converter in Silicon-On-Insulator", CLEO/Pacific Rim 2009.

SUMMARY

Technical Problem

However, in the conventional optical connection structure 100' shown in FIG. 11, a mode field of the Si waveguide 1 and a mode field of the optical fiber 2 may not be sufficiently coupled due to variations in manufacturing a tip of the Si waveguide core 1-1 having a tapered structure or the like.

FIGS. 12A and 12B illustrate a waveguide distribution between the Si waveguide 1 and the optical fiber 2 in FIG. 11. FIG. 12A shows a normalized power distribution seen from the y axis direction, and FIG. 12B shows a mode field distribution (solid line) in an optical fiber plane obtained based on waveguide analysis. As shown in FIGS. 12A and 12B, light emitted from an end surface of the Si waveguide 1 includes a large amount of light in a radiation mode propagating in a direction away from the optical axis. For this reason, the coupling efficiency with the optical fiber 2 is lowered as a result of variations in manufacturing the tip of the Si waveguide core 1-1 having a tapered structure and the like. In this example, a coupling efficiency CE is reduced to −1.4 dB.

Embodiments of the present invention have been made to solve such a problem, and an object of the present invention is to provide an optical connection structure which can improve the coupling efficiency between optical waveguides having different mode fields.

Means for Solving the Problem

In order to achieve such an object, embodiments of the present invention provide an optical connection structure that couples a first optical waveguide and a second optical waveguide having different mode fields, and includes an optical body which is provided in a propagation path of light between the first optical waveguide and the second optical waveguide, and changes a course of some of radiation mode light, which is emitted from the first optical waveguide and propagates in a direction away from an optical axis thereof, to obtain waveguide mode light passing through itself.

In embodiments of the present invention, the optical body changes the course of some of the radiation mode light, which is emitted from the first optical waveguide and propagates in the direction away from the optical axis, to obtain the waveguide mode light passing through itself. Thus, the amount of waveguide mode light incident on the second optical waveguide increases, and the coupling efficiency between the first optical waveguide and the second optical waveguide is improved.

Effects of Embodiments of the Invention

As described above, according to embodiments of the present invention, the optical body that changes the course of some of the radiation mode light, which is emitted from the first optical waveguide and propagates in the direction away from the optical axis, to obtain waveguide mode light passing through itself, is provided in the propagation path of light between the first optical waveguide and the second optical waveguide, and thus by increasing the amount of the waveguide mode light incident on the second optical waveguide, the coupling efficiency between optical waveguides having different mode fields can be improved.

DETAILED DESCRIPTION OF ILLUSTRATIVE EMBODIMENTS

Hereinafter, embodiments of the present invention will be described in detail with reference to the drawings.

Figure 1A:
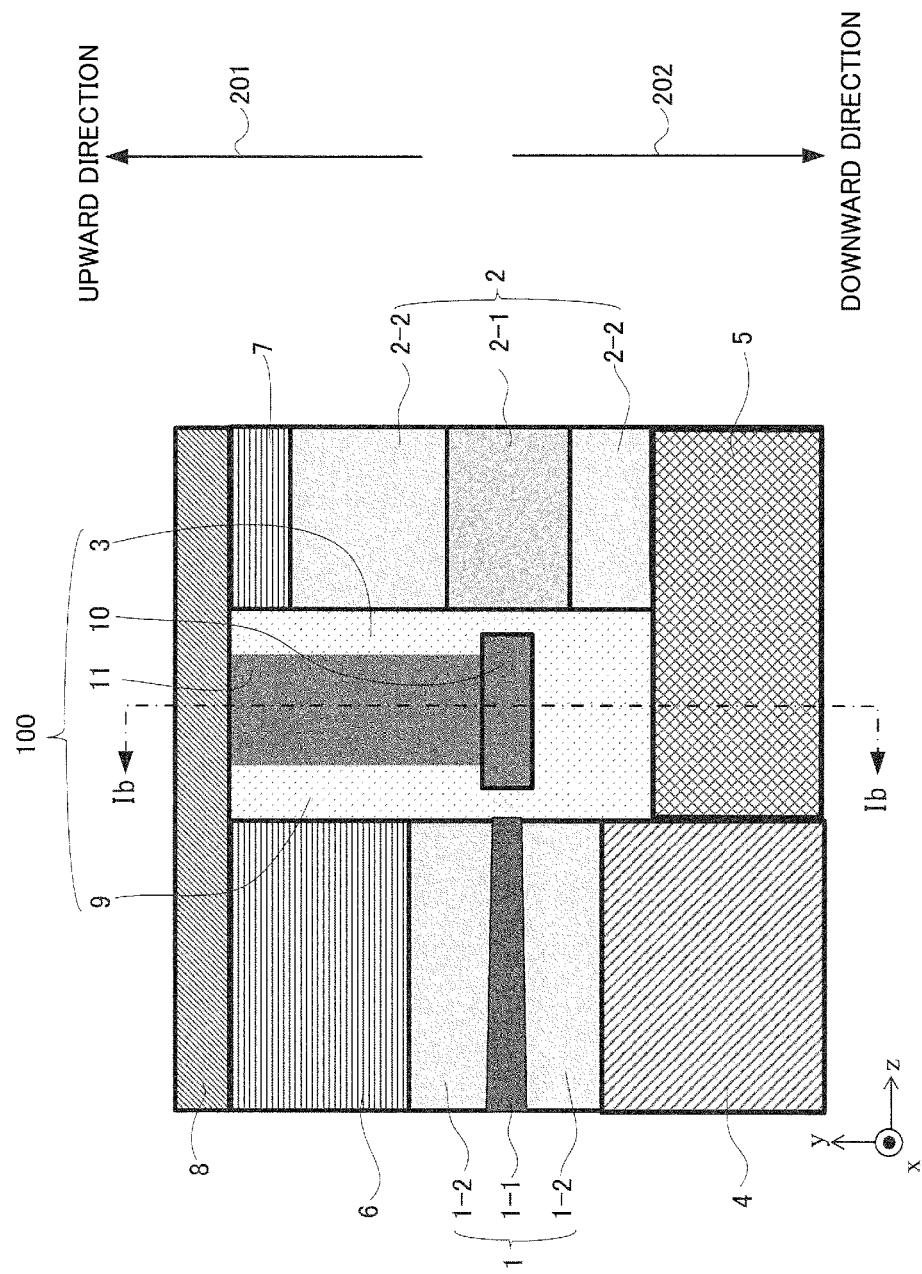
FIG. 1A is a side view schematically showing an optical connection structure according to an embodiment of the present invention.
Figure 1B:
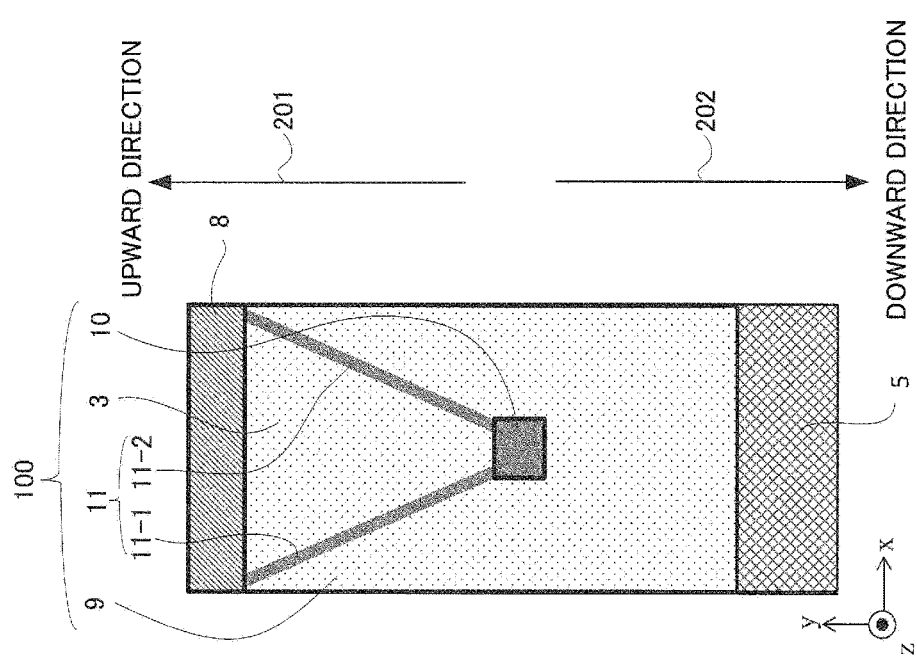
FIG. 1B is a cross-sectional view along line Ib-Ib in FIG. 1A.
Figure 11:
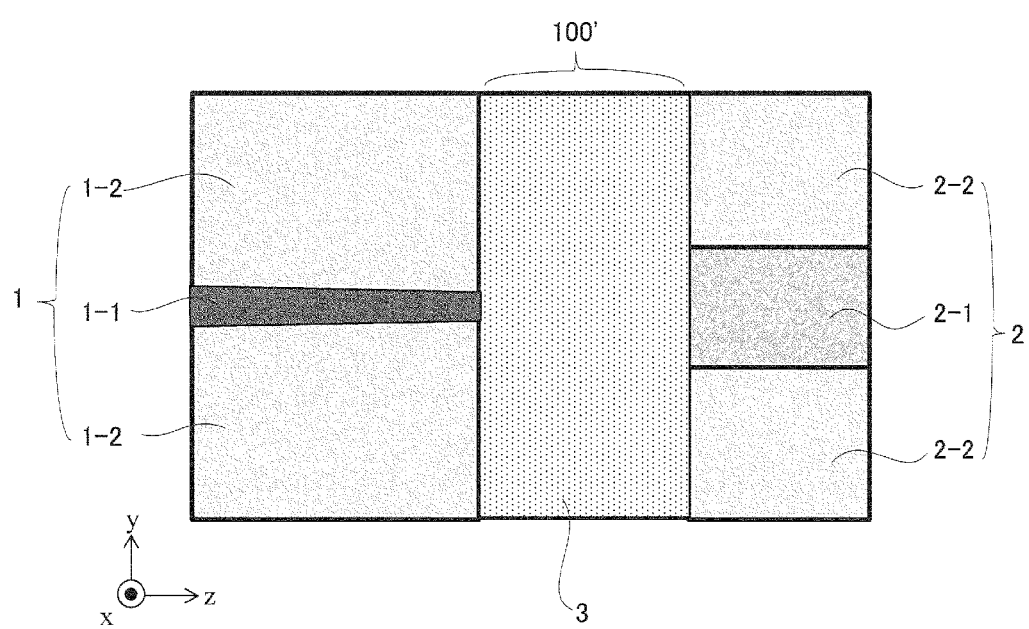
FIG. 11 is a diagram illustrating a conventional optical connection structure.

FIGS. 1A and 1B are schematic views showing an optical connection structure according to an embodiment of the present invention, FIG. 1A is a side view thereof, and FIG. 1B is a cross-sectional view along line Ib-Ib in FIG. 1A. In FIGS. 1A and 1B, the same components as those described with reference to FIG. 11 are denoted by the same reference numerals, and repeated descriptions thereof will be omitted. Further, in FIGS. 1A and 1B, a direction shown by arrow 201 is an upward direction, and a direction shown by arrow 202 is a downward direction.

In FIGS. 1A and 1B, positions of a Si waveguide 1 and an optical fiber 2 are adjusted such that an optical axis of the Si waveguide 1 and an optical axis of the optical fiber 2 coincide with each other, and the Si waveguide 1 and the optical fiber 2 are fixed respectively to a waveguide fixing base 4 and an optical axis adjusting base 5 having a V groove.

A block 6 is joined to an upper surface of the Si waveguide 1, that is, an upper surface of a Si waveguide clad 1-2, and a block 7 is joined to an upper surface of the optical fiber 2, that is, an upper surface of a fiber clad 2-2. Further, a part of a lower surface of a plate-shaped bridge body 8 is joined to upper surfaces of the block 6 and the block 7, and the bridge body 8 bridges between the block 6 and the block 7.

In addition, materials of the blocks 6 and 7 are preferably an adhesive for fixing a waveguide having a small thermal expansion coefficient. These blocks 6 and 7 are responsible for fixing and supporting the bridge body 8. Thicknesses of the blocks 6 and 7 are adjusted such that the bridge body 8 is supported horizontally, and an optical axis of an optical body 10, which will be described later, an optical axis of the Si waveguide 1, and an optical axis of the optical fiber 2 are aligned with each other. For example, a material of the bridge body 8 can be a material having high thermal conductivity (for example, silicon).

Further, a hollow region 9 which is surrounded by the Si waveguide 1, the waveguide fixing base 4, the block 6, the optical fiber 2, the optical axis adjusting base 5, the block 7, and the bridge body 8, is formed between an end surface of the Si waveguide 1 and an end surface of the optical fiber 2, and the optical body 10 that acts as a core is provided in the hollow region 9.

The optical body 10 has a rectangular parallelepiped shape and is supported by the bridge body 8 bridging between the Si waveguide 1 and the optical fiber 2 via a support 11. The optical body 10 and the support 11 are made of a photocurable resin and are members integrated with each other. In this example, they are manufactured by using a stereolithography apparatus using the bridge body 8 bridging between the block 6 and the block 7 as a substrate. Further, the hollow region 9 is filled with an epoxy-based or acrylic-based resin adhesive material 3.

The optical body 10 is supported by the bridge body 8 via the support 11 such that the optical axis of the optical body 10, the optical axis of the Si waveguide 1, and the optical axis of the optical fiber 2 coincide with each other. In addition, in this example, a length of the optical body 10 in the z direction is set to be 2.5 μm, a length in the x direction (width) is set to be 2.0 μm, and a length in the y direction (height) is set to be 2.0 μm. Further, a length of the hollow region 9 in the z direction is set to be 3 μm, a refractive index n1 of the optical body 10 is set to be larger than a refractive index n2 of the resin adhesive material 3, and n1 and n2 are set to be n1=1.7 and n2=1.5.

The support 11 is configured of a first support 11-1 and a second support 11-2 which are disposed to face each other along the optical axis of the optical body 10. The first support 11-1 and the second support 11-2 have flat plate shapes, the optical body 10 is formed at first end parts (the lowest parts) of the first support 11-1 and the second support 11-2, and the second end parts (the highest parts) of the first support 11-1 and the second support 11-2 are joined to the bridge body 8.

A distance between the first support 11-1 and the second support 11-2 narrows from the bridge body 8 toward the optical body 10. A distance between the first support 11-1 and the second support 11-2 at their positions connected with the optical body 10 is set to be equal to or less than a width of the optical body 10 in the x direction. It is desirable that lengths of the first support 11-1 and the second support 11-2 in the z direction be smaller than the length of the optical body 10 in the z direction. Further, it is desirable that thicknesses of the first support 11-1 and the second support 11-2 which have flat plate shapes be equal to or less than a propagation wavelength.

The optical connection structure wo according to the present embodiment includes, in the connection structure between the Si waveguide 1 and the optical fiber 2, the support 11 of which one end part is joined to the bridge body 8, the optical body 10 formed at the other end part of the support 11, the hollow region 9 provided with the optical body 10 and the support 11, and the resin adhesive material 3 filled into the hollow region 9.

Also, the Si waveguide 1 may have a tapered structure in which a cross-sectional area of the core monotonically reduces in a propagation direction of light, but the Si waveguide 1 may have a structure in which the cross-sectional area of the core is constant. In addition, a shape of a cross-section of the Si waveguide core 1-1 orthogonal to its optical axis is rectangular, a length of an exit end surface thereof in the y direction (height) is set to be 0.2 μm, and a length in the x direction (width) is set to be 0.5 μm. Further, the fiber core 2-1 of the optical fiber 2 reduces in diameter near an incident end surface thereof, and a diameter thereof is set to be 4 μm. The propagation wavelength is set to be 1.55 μm.

Figure 2A:
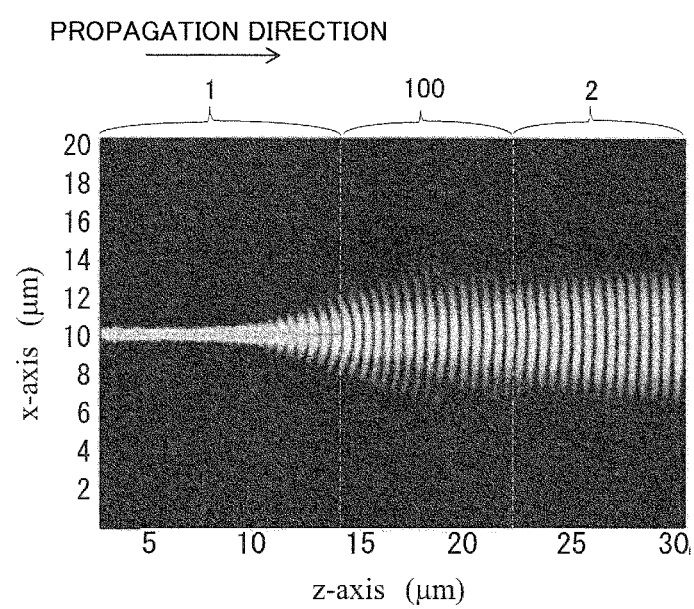
FIG. 2A is a diagram illustrating a waveguide distribution between a Si waveguide and an optical fiber using the optical connection structure.
Figure 2B:
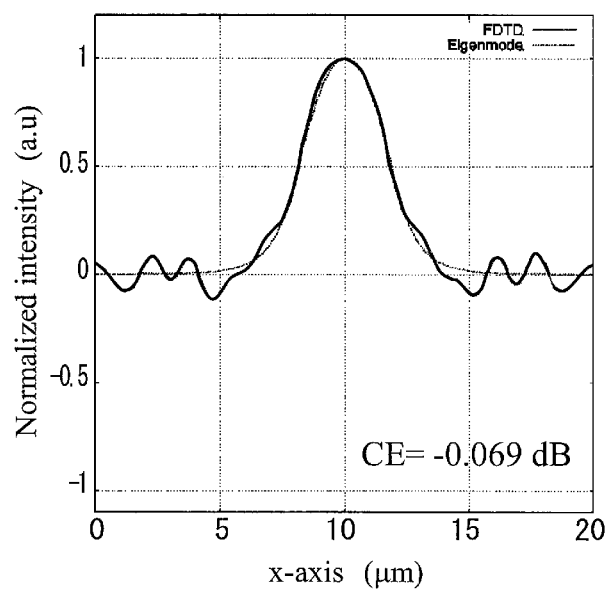
FIG. 2B is a diagram illustrating a waveguide distribution between the Si waveguide and the optical fiber using the optical connection structure.

FIGS. 2A and 2B illustrate a waveguide distribution between the Si waveguide 1 and the optical fiber 2 using the optical connection structure 100. FIG. 2A shows a normalized power distribution seen from the y axis direction, and FIG. 2B shows a mode field distribution (solid line) in an optical fiber plane obtained on the basis of waveguide analysis.

Figure 12A:
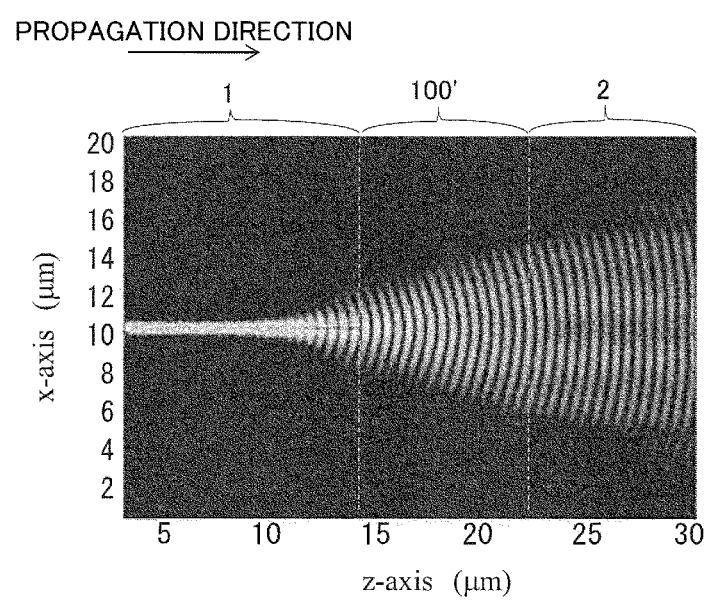
FIG. 12A is a diagram illustrating a waveguide distribution between a Si waveguide and an optical fiber in the conventional optical connection structure.
Figure 12B:
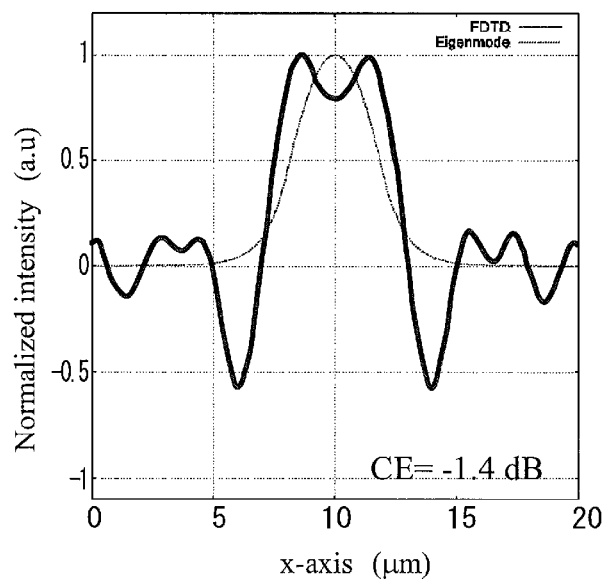
FIG. 12B is a diagram illustrating a waveguide distribution between the Si waveguide and the optical fiber in the conventional optical connection structure.

In the optical connection structure 100 according to the present embodiment, the optical body 10 provided in a propagation path of light between the Si waveguide 1 and the optical fiber 2 changes a course of some of radiation mode light, which is emitted from the Si waveguide 1 and propagates in a direction away from the optical axis, to obtain waveguide mode light that passes through the optical body 10 itself. Thus, the amount of waveguide mode light incident on the optical fiber 2 increases, and the coupling efficiency between the Si waveguide 1 and the optical fiber 2 is improved. In this example, as shown in FIG. 2B, a shape of the mode field distribution in the fiber plane was adjusted and the coupling efficiency CE was improved to −0.069 dB. That is, the coupling efficiency CE in the conventional optical connection structure 100' was −1.4 dB (FIG. 12B), whereas the optical connection structure 100 according to the present embodiment was improved to −0.069 dB.

Figure 3:
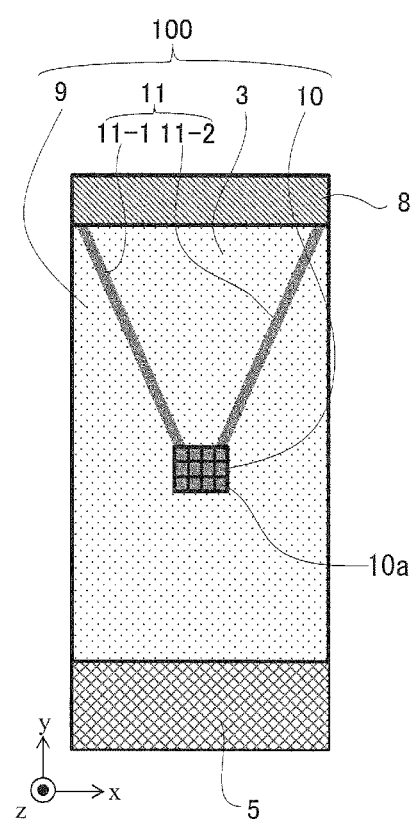
FIG. 3 is a diagram showing an example in which an optical body is configured from a plurality of optical bodies disposed in an array.
Figure 4:
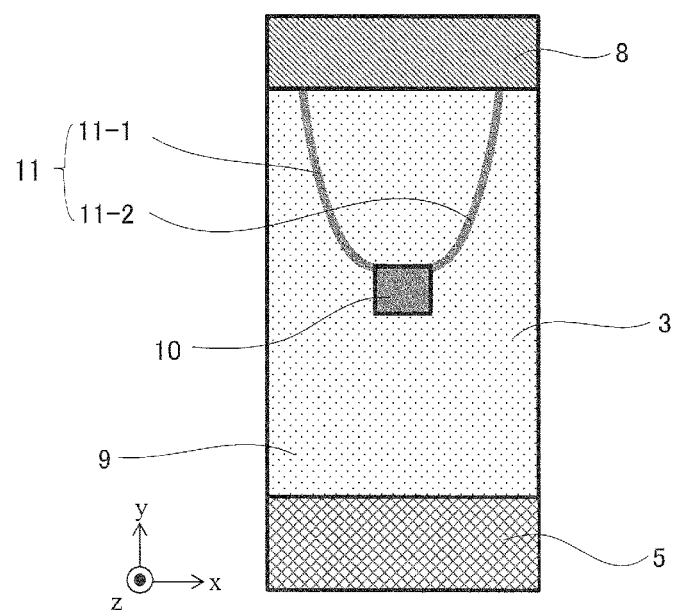
FIG. 4 is a diagram showing an example in which a support has a curved surface shape.
Figure 5:
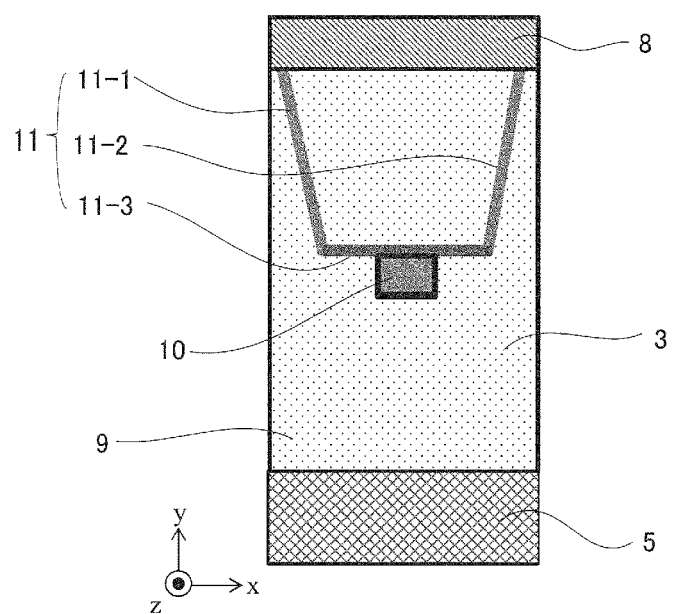
FIG. 5 is a diagram showing an example in which an optical body is joined to a lower surface of a support.

In the above-described embodiment, the optical body 10 has a rectangular parallelepiped shape, but it may be a hexahedron or the like, or may have a shape in which an area of a surface thereof perpendicular to the optical axis decreases toward the optical fiber 2. Also, as shown in FIG. 3, the optical body 10 may be configured of a plurality of optical bodies 10a disposed in an array in the x and y directions. In addition, as shown in FIG. 4, the supports 11-1 and 11-2 may have curved surface shapes instead of flat plate shapes. Further, as shown in FIG. 5, the support 11 may have a structure having a flat plate-shaped bottom surface 11-3 that integrally connects the support 11-1 with the support 11-2, and the optical body 10 may be joined to the bottom surface 11-3 of the support 11. Also, FIGS. 3, 4, and 5 and FIGS. 7, 9, and 10, which will be described later, are diagrams corresponding to FIG. 1B.

Figure 6:
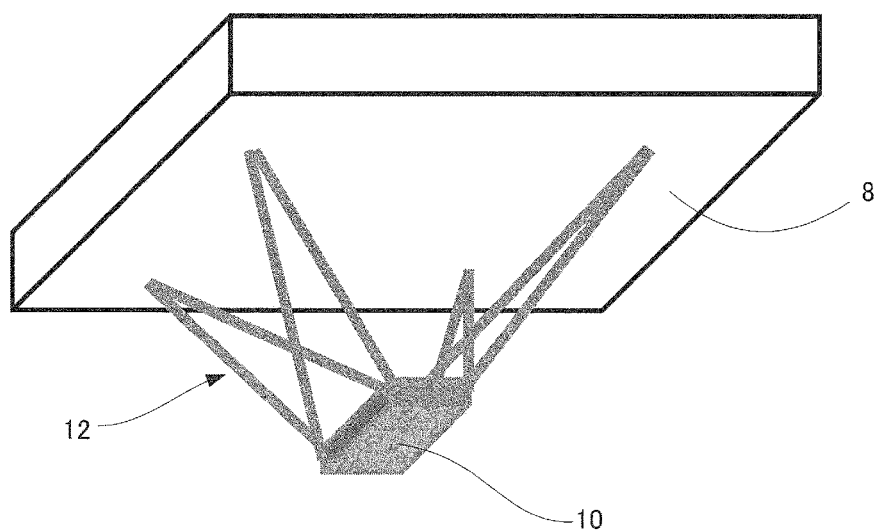
FIG. 6 is a perspective view showing an example in which a support having a truss structure is provided.
Figure 7:
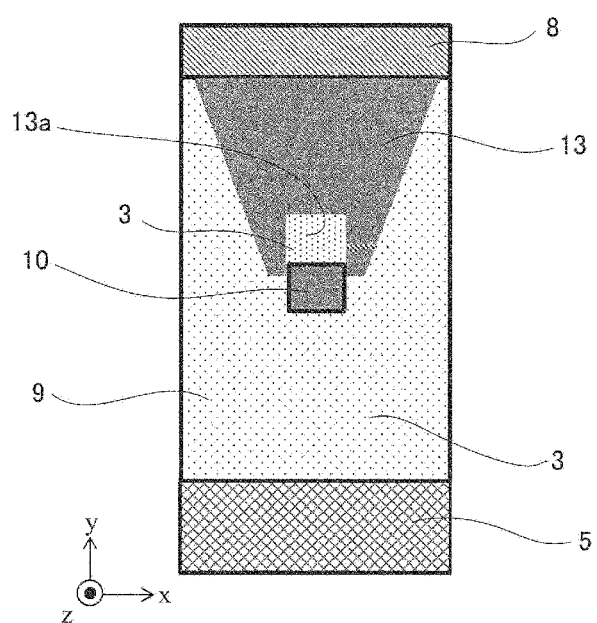
FIG. 7 is a diagram showing an example in which a frustum-shaped support is provided.

Also, as shown in FIG. 6, instead of the support 11, a support 12 having a truss structure (a structural form in which members are connected to each other while forming triangles) may be provided. In addition, as shown in FIG. 7, instead of the support 11, a frustum-shaped support 13 may be provided, and the optical body 10 may be joined to a lower surface of the support 13. Further, in the example shown in FIG. 7, a gap 13a penetrating in the z direction is formed on the lower surface of the support 13, and the optical body 10 is joined to a lower side of the gap 13a. Also, the gap 13a is filled with the resin adhesive material 3.

Figure 8A:
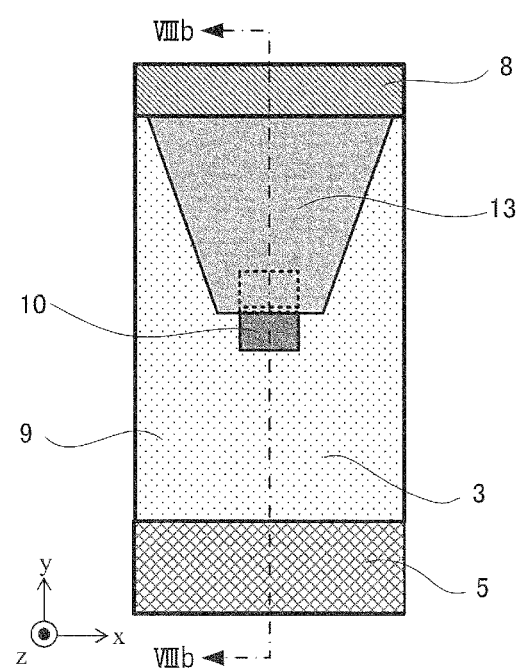
FIG. 8A is a diagram showing an example in which a gap (a recessed part) is provided in a central part of a lower surface of the frustum-shaped support.
Figure 8B:
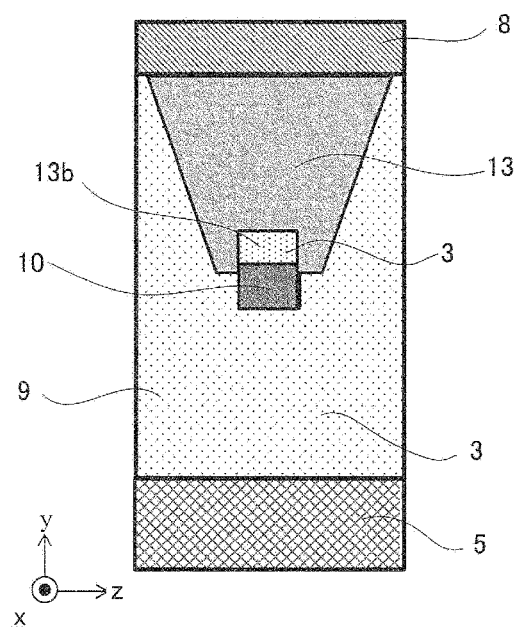
FIG. 8B is a cross-sectional view along line VIIIb-VIIIb in FIG. 8A.

Further, as shown in FIGS. 8A and 8B, a gap (recessed part) 13b may be provided in a center part of the lower surface of the frustum-shaped support 13 and the optical body 10 may be bonded to a lower side of the gap 13b. Also, FIG. 8A is a diagram of the support 13 viewed in the z direction, and FIG. 8B is a cross-sectional view along line VIIIb-VIIIb in FIG. 8A. In this figure, the gap 13b is filled with the resin adhesive material 3, but the gap 13b does not necessarily need to be filled with the resin adhesive material 3. That is, an upper part of the optical body 10 may be just a space.

As shown in FIGS. 8A and 8B, when the gap 13b is not a gap penetrating in the z direction, the radiation mode light that is emitted from the Si waveguide 1 and propagates in the direction away from the optical axis passes through the support 13 and enters the gap 13b, and some of the light changes its course to be the waveguide mode light that passes through the optical body 10 itself. If there is no gap 13b, the path of the light cannot be changed, and the light does not become waveguide mode light that passes through the optical body 10 itself. For this reason, it is necessary to provide the gap 13b above the optical body 10.

Figure 9:
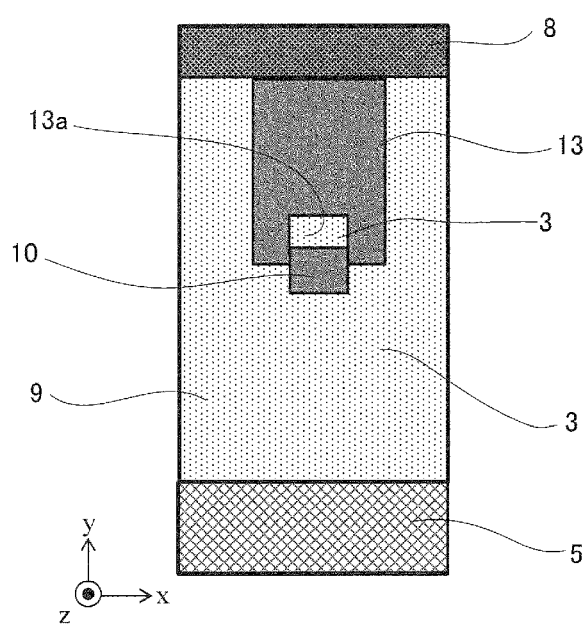
FIG. 9 is a diagram showing an example in which the support is a three-dimensional object having a columnar shape.
Figure 10:
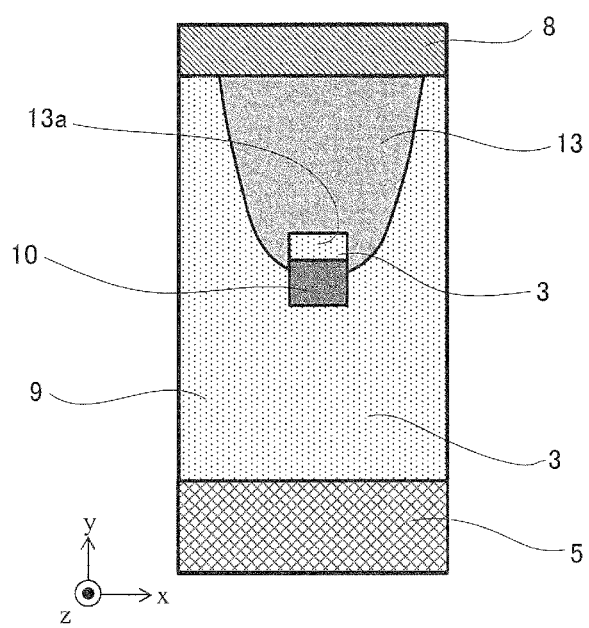
FIG. 10 is a diagram showing an example in which the support is a three-dimensional object having a mountain shape.

In addition, in the example shown in FIG. 7, the support 13 has a frustum shape, but as long as the support 13 is a three-dimensional object having two or more surfaces, this is sufficient, and it may be a three-dimensional object having a columnar shape as shown in FIG. 9, or may be a three-dimensional object having a mountain shape as shown in FIG. 10. Further, in the above-described embodiment, the hollow region 9 is filled with the resin adhesive material 3, but the hollow region 9 does not necessarily have to be filled with the resin adhesive material 3.

Extension of Embodiments

Although the present invention has been described above with reference to the embodiments, the present invention is not limited to the above embodiments. Various changes that can be understood by those skilled in the art can be made to the structures and details of the present invention within the scope of the technical idea of the present invention.

REFERENCE SIGNS LIST

1 Si waveguide
1-1 Si waveguide core
1-2 Si waveguide clad
2 Optical fiber
2-1 Fiber core
2-2 Fiber clad
3 Resin adhesive material
4 Waveguide fixing base
5 Optical axis adjusting base
6, 7 Block
8 Bridge body
9 Hollow region
10 Optical body
11, 12, 13 Support
13a, 13b Gap

The invention claimed is:
1. An optical connection structure for coupling a first optical waveguide and a second optical waveguide having different mode fields, the optical connection structure comprising:
 an optical body in a propagation path of light between the first optical waveguide and the second optical waveguide and configured to change a course of radiation mode light emitted from the first optical waveguide and propagating in a direction away from an optical axis thereof to obtain waveguide mode light passing through the optical body, wherein the optical body is supported by a bridge body bridging between the first optical waveguide and the second optical waveguide via a support comprising a first support and a second support facing each other along the optical axis of the optical body, wherein the optical body is at first end parts of the first support and the second support and second end parts of the first support and the second support are joined to the bridge body.

2. The optical connection structure according to claim 1, wherein the optical body is integral with the first end parts of the first support and the second support.

3. The optical connection structure according to claim 1, wherein the support is a three-dimensional object having two or more surfaces.

4. The optical connection structure according to claim 1, wherein the optical body and the support comprise a photocurable resin.

5. The optical connection structure according to claim 1, wherein the optical body and the support are provided in a hollow region between the first optical waveguide and the second optical waveguide.

6. The optical connection structure according to claim 5, wherein the hollow region is filled with a resin material.

7. The optical connection structure according to claim 6, wherein a refractive index of the optical body is larger than a refractive index of the resin material.

8. The optical connection structure according to claim 1, wherein the second optical waveguide is an optical fiber, and a maximum width of the optical body in a plane perpendicular to the optical axis is smaller than a diameter of a core of the second optical waveguide.

9. An optical connection structure comprising:
a Si waveguide coupled to an optical fiber, the Si waveguide and the optical fiber having different mode fields;
an optical body in a propagation path of light between the Si waveguide and the optical fiber and configured to change a course of radiation mode light emitted from the Si waveguide and propagating in a direction away from an optical axis thereof to obtain waveguide mode light passing through the optical body;
a bridge body bridging the Si waveguide and the optical fiber; and
a support coupled to the bridge body and configured to support the optical body, wherein the support includes a first support and a second support facing each other along the optical axis of the optical body, first end parts of the first support and the second support are joined to the optical body, and second end parts of the first support and the second support are joined to the bridge body.

10. The optical connection structure according to claim 9, wherein the first end parts of the first support and the second support are integral with the optical body, and the second end parts of the of the first support and the second support are joined to the bridge body.

11. The optical connection structure according to claim 9, wherein the first support and the second support have flat plate shapes or curved surface shapes.

12. The optical connection structure according to claim 9, wherein the support is a three-dimensional object having two or more surfaces.

13. The optical connection structure according to claim 9, wherein the support has a truss structure.

14. The optical connection structure according to claim 9, wherein the optical body and the support comprise a photocurable resin.

15. The optical connection structure according to claim 9, wherein the optical body and the support are provided in a hollow region between the Si waveguide and the optical fiber.

16. The optical connection structure according to claim 15, wherein the hollow region is filled with a resin material.

17. The optical connection structure according to claim 16, wherein a refractive index of the optical body is larger than a refractive index of the resin material.

18. An optical connection structure comprising:
a first optical waveguide coupled to a second optical waveguide, the first optical waveguide and the second optical waveguide having different mode fields;
a bridge body bridging the first optical waveguide and the second optical waveguide;
a support having an upper surface and a lower surface, wherein the upper surface is coupled to the bridge body, and wherein a gap is disposed in a center part of the lower surface; and
an optical body in a propagation path of light between the first optical waveguide and the second optical waveguide, wherein the optical body is joined to a lower side of the gap of the support and is configured to change a course of radiation mode light emitted from the first optical waveguide and propagating in a direction away from an optical axis thereof to obtain waveguide mode light passing through the optical body.

19. The optical connection structure according to claim 18, wherein the support has a frustum-shaped support structure, a columnar shape, or a mountain shape.

20. The optical connection structure according to claim 18, wherein:
the optical body and the support are disposed in a hollow region between the first optical waveguide and the second optical waveguide;
the hollow region is filled with a resin material; and
a refractive index of the optical body is larger than a refractive index of the resin material.

* * * * *